(12) United States Patent
Tajima et al.

(10) Patent No.: US 8,882,646 B2
(45) Date of Patent: Nov. 11, 2014

(54) SEMICONDUCTIVE ROLLER, CHARGING ROLLER AND ELECTROPHOTOGRAPHIC APPARATUS

(75) Inventors: Kei Tajima, Kobe (JP); Kiyotaka Okuda, Kobe (JP); Takashi Marui, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 320 days.

(21) Appl. No.: 13/047,919

(22) Filed: Mar. 15, 2011

(65) Prior Publication Data

US 2011/0281703 A1 Nov. 17, 2011

(30) Foreign Application Priority Data

May 12, 2010 (JP) ................................ 2010-110276
Sep. 24, 2010 (JP) ................................ 2010-213725

(51) Int. Cl.
| | |
|---|---|
| *F16C 13/00* | (2006.01) |
| *C08L 71/03* | (2006.01) |
| *C08L 9/02* | (2006.01) |
| *C08L 71/02* | (2006.01) |
| *G03G 15/02* | (2006.01) |
| *C08K 5/00* | (2006.01) |

(52) U.S. Cl.
CPC ............ *G03G 15/0233* (2013.01); *C08L 71/03* (2013.01); *C08L 9/02* (2013.01); *C08G 2261/12* (2013.01); *F16C 13/00* (2013.01); *C08L 71/02* (2013.01); *C08K 5/0025* (2013.01)
USPC ................................ 492/56; 492/53; 492/59

(58) Field of Classification Search
USPC ......................................... 492/56, 53, 59, 49
See application file for complete search history.

(56) References Cited

U.S. PATENT DOCUMENTS

| | | | |
|---|---|---|---|
| 6,043,308 A | 3/2000 | Tanahashi et al. | |
| 6,648,807 B2 * | 11/2003 | Hashimoto et al. | ............. 492/59 |
| 7,070,552 B2 * | 7/2006 | Mizumoto | ...................... 492/56 |
| 7,641,973 B2 * | 1/2010 | Hattori et al. | ................. 428/421 |
| 7,932,318 B2 * | 4/2011 | Hattori et al. | ................. 524/556 |
| 8,211,000 B2 * | 7/2012 | Marui et al. | ..................... 492/53 |
| 8,235,879 B2 * | 8/2012 | Tsuchiya et al. | ................ 492/56 |

(Continued)

FOREIGN PATENT DOCUMENTS

| | | | | |
|---|---|---|---|---|
| JP | 2001140855 A | * | 5/2001 | ............. G03G 15/02 |
| JP | 2002251054 A | * | 9/2002 | ............. G03G 15/02 |

(Continued)

OTHER PUBLICATIONS

English machine translation of JP 2006145636.*

*Primary Examiner* — Essama Omgba
(74) *Attorney, Agent, or Firm* — Birch, Stewart, Kolasch & Birch, LLP

(57) ABSTRACT

The semiconductive roller according to the present invention includes: a roller body having an outer peripheral surface made of a semiconductive rubber composition; and an oxide film covering the outer peripheral surface of the roller body, while the semiconductive rubber composition contains a base polymer and a crosslinking component for crosslinking the base polymer, the base polymer is a mixture of a bicopolymer E containing epichlorohydrin and nitrile-butadiene rubber N, the mass ratio E/N of the bicopolymer E and the nitrile-butadiene rubber N in the mixture is 50/50 to 80/20, and the crosslinking component includes a thiourea-based crosslinking component for crosslinking the bicopolymer E and a sulfur-based vulcanizing component for vulcanizing the nitrile-butadiene rubber N.

8 Claims, 3 Drawing Sheets

(56) References Cited

U.S. PATENT DOCUMENTS

| | | | |
|---|---|---|---|
| 2002/0128139 A1* | 9/2002 | Hashimoto et al. | 492/59 |
| 2003/0096917 A1 | 5/2003 | Hattori et al. | |
| 2004/0105983 A1* | 6/2004 | Hattori et al. | 428/421 |
| 2004/0106708 A1 | 6/2004 | Mizumoto et al. | |
| 2004/0110617 A1* | 6/2004 | Mizumoto | 492/56 |
| 2004/0229967 A1 | 11/2004 | Hattori et al. | |
| 2004/0230011 A1 | 11/2004 | Hattori et al. | |
| 2005/0261468 A1 | 11/2005 | Hattori et al. | |
| 2006/0074162 A1 | 4/2006 | Mizumoto et al. | |
| 2006/0284142 A1 | 12/2006 | Mizumoto | |
| 2008/0281027 A1* | 11/2008 | Hattori et al. | 524/424 |
| 2009/0005225 A1* | 1/2009 | Tsuchiya et al. | 492/56 |
| 2010/0069208 A1* | 3/2010 | Marui et al. | 492/59 |
| 2010/0222483 A1* | 9/2010 | Hattori et al. | 524/424 |
| 2011/0110690 A1* | 5/2011 | Lim et al. | 399/286 |
| 2011/0281703 A1 | 11/2011 | Tajima et al. | |
| 2012/0193587 A1 | 8/2012 | Sakuraba et al. | |
| 2012/0201572 A1* | 8/2012 | Kim et al. | 399/176 |
| 2012/0202663 A1* | 8/2012 | Mizumoto et al. | 492/18 |

FOREIGN PATENT DOCUMENTS

| | | | | |
|---|---|---|---|---|
| JP | 2002296930 A | * | 10/2002 | G03G 15/02 |
| JP | 2003064251 A | * | 3/2003 | C08L 71/03 |
| JP | 2003-183494 A | | 7/2003 | |
| JP | 2003183494 A | * | 7/2003 | C08L 71/03 |
| JP | 2003213028 A | * | 7/2003 | C08J 9/10 |
| JP | 3449726 B2 | | 9/2003 | |
| JP | 2004-176056 A | | 6/2004 | |
| JP | 2005-49852 A | | 2/2005 | |
| JP | 2005-275288 A | | 10/2005 | |
| JP | 2006145636 A | * | 6/2006 | G03G 15/16 |
| JP | 2006-348245 A | | 12/2006 | |
| JP | 2009-151001 A | | 7/2009 | |

* cited by examiner

SEMICONDUCTIVE ROLLER, CHARGING ROLLER AND ELECTROPHOTOGRAPHIC APPARATUS

BACKGROUND OF THE INVENTION

1. Field of the Invention

The present invention relates to a semiconductive roller and a charging roller employing the same, as well as an electrophotographic apparatus including the charging roller.

2. Description of Related Art

An image forming apparatus such as a laser printer, an electrostatic copier, a plain-paper facsimile or a composite apparatus thereof includes a charging roller and a developing roller.

The charging roller uniformly charges the surface of a photosensitive body in the image forming apparatus. The developing roller develops an electrostatic latent image formed by exposing the charged surface of the photosensitive body into a toner image by sticking a toner thereto.

In general, a semiconductive roller including a roller body made of a semiconductive rubber composition, a coating film made of urethane-based resin or the like covering the outer peripheral surface of the roller body and a shaft made of metal or the like inserted into the center of the roller body, for example, has been employed as this type of charging roller or developing roller (refer to Japanese Patent No. 3449726, for example).

The coating film is provided for preventing the components of the semiconductive rubber composition from bleeding on the outer peripheral surface of the roller body and thereby staining the photosensitive body directly coming into contact with the charging roller or the developing roller. In other words, the coating film is provided for preventing influence exerted on the formed image due to staining of the photosensitive body. Further, the coating film is provided also for preventing an additive such as silica added to the toner for improving flowability and chargeability thereof from being accumulated on the outer peripheral surface of the roller body to influence the formed image.

The coating film is formed by applying the raw material (a liquid coating agent) therefor to the outer peripheral surface of the roller body by a method such as spraying or dipping and drying the applied raw material.

However, this method easily results in various defectives such as contamination with foreign matter such as dust, irregularity in thickness etc. in the process of forming the coating film. Further, this method is an already established technique, and allows only small room for further improvement. Therefore, it is difficult to remarkably reduce the rate of defectives (the rejection rate). This results in reduction of the yield and productivity of the semiconductive roller and increase in the manufacturing cost.

As a method of forming a coating film different from the aforementioned one, a method of forming a roller body by a semiconductive rubber composition containing diene rubber and oxidizing the diene rubber by irradiating the outer peripheral surface of the roller body with ultraviolet light thereby forming a coating film (an oxide film) is proposed (refer to Japanese Unexamined Patent Publication No. 2004-176056, for example).

SUMMARY OF THE INVENTION

The oxide film for serving as a coating film is formed by irradiating the outer peripheral surface of the roller body with ultraviolet light thereby oxidizing the diene rubber contained in the semiconductive rubber composition forming the outer peripheral surface. Therefore, there is little possibility that the oxide film is contaminated with foreign matter such as dust in the process of forming the oxide film. Further, the oxidation can be uniformly progressed on the outer peripheral surface of the roller body due to the ultraviolet irradiation, and hence there is also little possibility that the oxide film is irregularized in thickness.

However, the present oxide film is insufficient in characteristics for serving as a protective film preventing the aforementioned staining of the photosensitive body resulting from bleeding of the components of the semiconductive rubber composition and influence on the formed image resulting from accumulation of the toner additive on the outer peripheral surface of the roller body, as compared with the conventional coating film.

For example, the inventors have conducted a stain resistance test on a semiconductive roller having a conventional oxide film formed by oxidation of diene rubber, to confirm that formed images were influenced. The stain resistance test was conducted by investigating whether or not the formed images were influenced when the semiconductive roller was stood still in an environment having a temperature of 50° C. and relative humidity of 90% for 30 days while the outer peripheral surface of the roller body was brought into contact with the surface of a photosensitive body and thereafter employed for forming the images with the photosensitive body.

An object of the present invention is to provide a semiconductive roller having excellent semiconductivity for serving as a charging roller or a developing roller and including an oxide film having excellent characteristics for serving as a protective film and a charging roller employing the same, as well as an electrophotographic apparatus including the charging roller.

In order to solve the aforementioned problem, the inventors have made various studies on components constituting a semiconductive rubber composition serving as the raw material for a roller body of the semiconductive roller. As a result, they have found that the following five conditions (1) to (5) must be satisfied, and completed the present invention.

(1) The semiconductive rubber composition contains a base polymer and a crosslinking component for crosslinking the base polymer, and does not contain conductive particles of carbon black or the like having electron conductivity, dissimilarly to the invention described in Japanese Patent No. 3449726. The condition (1) is particularly effective for preventing dispersion in electrical resistance in the same roller body.

(2) The base polymer is a mixture of a bicopolymer E containing epichlorohydrin and nitrile-butadiene rubber N. A monopolymer of epichlorohydrin and a bicopolymer or a tricopolymer containing epichlorohydrin are known as epichlorohydrin rubber. In order to provide an oxide film formed on the outer peripheral surface of the roller body by ultraviolet irradiation with excellent characteristics for serving as a protective film, the bicopolymer containing epichlorohydrin must be selectively employed.

(3) Nitrile-butadiene rubber is a kind of diene rubber. While various types of diene rubber are present, nitrile-butadiene rubber and chloroprene rubber excellent in compatibility are employable in consideration of compatibility with the bicopolymer containing epichlorohydrin. In order to provide the oxide film formed on the outer peripheral surface of the roller body by ultraviolet irradiation with excellent characteristics for serving as the protective film, nitrile-butadiene rubber must be selectively employed.

(4) The mass ratio E/N of the bicopolymer E containing epichlorohydrin and the nitrile-butadiene rubber N in the mixture of the bicopolymer E containing epichlorohydrin and the nitrile-butadiene rubber N must be set in the range of 50/50 to 80/20. Thus, the oxide film formed on the outer peripheral surface of the roller body by ultraviolet irradiation is provided with excellent characteristics for serving as the protective film, while the roller body is provided with excellent semiconductivity as a charging roller or a developing roller.

(5) As the crosslinking component, a thiourea-based crosslinking component for crosslinking the bicopolymer E containing epichlorohydrin and a sulfur-based vulcanizing component for vulcanizing the nitrile-butadiene rubber N must be employed together.

Therefore, the semiconductive roller according to the present invention includes: a roller body having an outer peripheral surface made of a semiconductive rubber composition; and an oxide film covering the outer peripheral surface of the roller body, wherein the semiconductive rubber composition contains a base polymer and a crosslinking component for crosslinking the base polymer, the base polymer is a mixture of a bicopolymer E containing epichlorohydrin and nitrile-butadiene rubber N, while the mass ratio E/N of the bicopolymer E and the nitrile-butadiene rubber N in the mixture is 50/50 to 80/20, and the crosslinking component includes a thiourea-based crosslinking component for crosslinking the bicopolymer E and a sulfur-based vulcanizing component for vulcanizing the nitrile-butadiene rubber N.

As the thiourea-based crosslinking component, a thiourea-based crosslinking agent and a crosslinking accelerator accelerating crosslinking with the thiourea-based crosslinking agent are preferably employed together. As the sulfur-based vulcanizing component, at least one material selected from a group consisting of sulfur and a sulfur-containing vulcanizing agent and a sulfur-containing accelerator are preferably employed together.

The semiconductive rubber composition preferably further contains an ion-conductive agent, in order to improve the ion conductivity thereof thereby providing the roller body made of the semiconductive rubber composition with excellent semiconductivity for serving as a charging roller or a developing roller.

The ion-conductive agent is preferably prepared from a hydrophobic ion-conductive agent. The hydrophobic ion-conductive agent has no hygroscopicity. Therefore, the mass of the hydrophobic ion-conductive agent is not changed due to moisture absorption during measurement for addition to the semiconductive rubber composition, for example. Further, the hydrophobic ion-conductive agent is so easy to measure that the same can be prevented from dispersion in actual loading between batches.

Therefore, the semiconductive rubber composition can be inhibited from dispersion in ion conductivity per batch. Consequently, the semiconductivity of the roller body made of the semiconductive rubber composition can be kept generally constant over a plurality of semiconductive rollers. Therefore, the quality of the semiconductive roller can be improved.

In the roller body containing the hydrophobic ion-conductive agent, there is no possibility that the electrical resistance indicating the semiconductivity remarkably fluctuates due to environmental change, particularly humidity change. Therefore, environment dependency of the roller resistance of the semiconductive roller can be reduced.

The hydrophobic ion-conductive agent is preferably prepared from at least one material selected from a group consisting of tetrabutylammonium perchlorate and N-butyl-3-methylpyridinium•bistrifluoromethanesulfonylimide.

The semiconductive rubber composition preferably further contains at least one additive selected from a group consisting of a supplement vulcanization accelerator, an acid acceptor, a processing aid, a filler, an age resistor, an antioxidant, an antiscorching agent, an ultraviolet absorber, a lubricant, a pigment, a flame retardant, a neutralizer and an antifoaming agent. Thus, processability and moldability can be improved when preparing the semiconductive rubber composition by blending the components therefor and kneading the mixture and molding the prepared semiconductive rubber composition into the shape of the roller body, for example. Further, the resistance and strength of the roller body obtained by vulcanizing the molded semiconductive rubber composition can be improved. In addition, excellent characteristics of rubber such as flexibility, small compression set, resistance against flattening etc. can be provided to the roller body.

The semiconductive roller according to the present invention can be built into an image forming apparatus such as a laser printer utilizing electrophotography to be suitably employed as a charging roller for uniformly charging the surface of a photosensitive body, for example.

In other words, the charging roller according to the present invention is employed for an image forming apparatus utilizing electrophotography, and made of the semiconductive roller according to the present invention.

According to the inventive charging roller, excellent images can be regularly formed by the image forming apparatus while preventing the photosensitive body from staining.

The electrophotographic apparatus according to the present invention includes the inventive charging roller.

Thus, according to the present invention, a semiconductive roller having excellent semiconductivity for serving as a charging roller or a developing roller and including an oxide film having excellent characteristics for serving as a protective film and a charging roller employing the same as well as an electrophotographic apparatus including the charging roller can be provided.

The foregoing and other objects, features and effects of the present invention will become more apparent from the following detailed description of the embodiments with reference to the attached drawings.

DETAILED DESCRIPTION OF PREFERRED EMBODIMENTS

Figure 1:
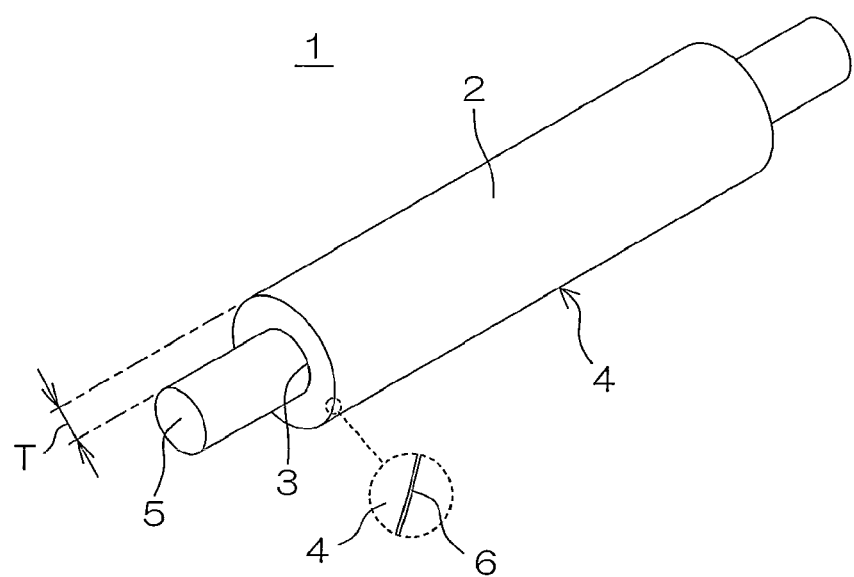
FIG. 1 is a schematic block diagram of a semiconductive roller according to an embodiment of the present invention.

FIG. 1 is a schematic block diagram of a semiconductive roller according to an embodiment of the present invention.

A semiconductive roller 1 includes a cylindrical roller body 4 having an outer peripheral surface 2 made of a semiconductive rubber composition and provided with a through-hole 3 along the axial direction, a shaft 5 inserted into the through-hole 3 at the center of the roller body 4 and an oxide film 6 covering the outer peripheral surface 2 of the roller body 4.

The thickness of the roller body 4 (the thickness T between the inner surface of the through-hole 3 and the outer peripheral surface 2) is preferably not less than 0.5 mm, more preferably not less than 1 mm, and particularly preferably not less than 3 mm when the semiconductive roller 1 is used as a charging roller for an electrophotographic apparatus, for example, in order to ensure a proper nip thickness while reducing the size and the weight of the charging roller. Further, the thickness T is preferably not more than 15 mm, more preferably not more than 10 mm, and particularly preferably not more than 7 mm.

The semiconductive rubber composition forming the roller body 4 contains a base polymer and a crosslinking component for crosslinking the base polymer.

The base polymer contained in the semiconductive rubber composition is made of a mixture of a bicopolymer E containing epichlorohydrin and nitrile-butadiene rubber N.

The bicopolymer E containing epichlorohydrin can be prepared from a bicopolymer of epichlorohydrin and any monomer copolymerizable with epichlorohydrin. More specifically, a bicopolymer (ECO) of epichlorohydrin and ethylene oxide is preferable.

In ECO, ethylene oxide functions to reduce the electrical resistance of the roller body 4. If the content of ethylene oxide is excessive, however, ethylene oxide is crystallized to hinder segment motion of molecular chains. Therefore, the electrical resistance of the roller body 4 contrarily tends to increase. Further, the hardness of the roller body 4 may increase, or the viscosity of the semiconductive rubber composition not yet crosslinked may increase to reduce processability and moldability.

Therefore, the content of ethylene oxide in ECO is preferably not less than 30 mole %, more preferably not less than 50 mole %, and particularly preferably not more than 80 mole %.

Examples of the nitrile-butadiene rubber N (NBR: acrylonitrile-butadiene rubber) include low nitrile NBR having an acrylonitrile content of not more than 24%, medium nitrile NBR having an acrylonitrile content of 25 to 30%, medium-high nitrile NBR having an acrylonitrile content of 31 to 35%, high nitrile NBR having an acrylonitrile content of 36 to 42%, extra-high nitrile NBR having an acrylonitrile content of not less than 43% and the like. A single type or not less than two types of such materials can be employed.

The mass ratio E/N of the bicopolymer E and the nitrile-butadiene rubber N in the mixture of the bicopolymer E and the nitrile-butadiene rubber N is 50/50 to 80/20.

The mass ratio E/N is limited to the range of 50/50 to 80/20 for the following reasons:

If the proportion of the bicopolymer E is less than 50, no effect of providing the roller body 4 with excellent semiconductivity for serving as a charging roller or a developing roller through the bicopolymer E is attained.

If the proportion of the nitrile-butadiene rubber N is less than 20, on the other hand, no effect of providing the oxide film 6 formed on the outer peripheral surface 2 by ultraviolet irradiation with excellent characteristics for serving as a protective film through the nitrile-butadiene rubber N is attained.

The crosslinking component contained in the semiconductive rubber composition consists of a thiourea-based crosslinking component for crosslinking the bicopolymer E and a sulfur-based vulcanizing component for vulcanizing the nitrile-butadiene rubber N.

The thiourea-based crosslinking component for crosslinking the bicopolymer E can be prepared from any thiourea-based crosslinking agent having thiourea groups in the molecules thereof and capable of crosslinking the bicopolymer.

Examples of the thiourea-based crosslinking agent include ethylene thiourea (another name: 2-mercaptoimidazoline), diethyl thiourea, dibutyl thiourea and the like. A single type or not less than two types of such materials can be employed. Among the materials, ethylene thiourea or the like can be preferably employed.

The content of the thiourea-based crosslinking agent is preferably 0.3 to 1 part by mass with respect to 100 parts by mass of the base polymer in total (the sum of the bicopolymer E and the nitrile-butadiene rubber N), for example. If the content of the thiourea-based crosslinking agent is in the above range, excellent characteristics of rubber such as flexibility, small compression set, resistance against flattening etc. can be provided to the roller body 4 by excellently crosslinking the bicopolymer E contained in the base polymer.

As the thiourea-based crosslinking component, any crosslinking accelerator accelerating crosslinking caused by the thiourea-based crosslinking agent can be employed along with the thiourea-based crosslinking agent.

Examples of the crosslinking accelerator include guanidine-based accelerators such as 1,3-diphenylguanidine (D), 1,3-di-o-tolylguanidine (DT), 1-o-tolylbiguanide (BG) and the like. A single type or not less than two types of such materials can be employed.

The content of the crosslinking accelerator is preferably 0.3 to 1 part by mass with respect to 100 parts by mass of the base polymer in total, for example. If the content of the crosslinking accelerator is in the above range, an effect of accelerating the crosslinking of the bicopolymer E with the thiourea-based crosslinking agent can be sufficiently attained.

The sulfur-based vulcanizing component for vulcanizing the nitrile-butadiene rubber N can be prepared from at least one material selected from a group consisting of sulfur and a sulfur-containing vulcanizing agent (an organic compound having sulfur in the molecules thereof), for example. The sulfur-containing vulcanizing agent can be prepared from 4,4'-dithiodimorpholine (R), for example. Among the materials, sulfur is preferably employed.

When sulfur is contained as the sulfur-based vulcanizing component, the content thereof is preferably 1 to 2 parts by mass with respect to 100 parts by mass of the base polymer in total. If the sulfur-containing vulcanizing agent is contained as the sulfur-based vulcanizing component, on the other hand, the content thereof is preferably so adjusted that the quantity of sulfur in the molecules of the vulcanizing agent is in the aforementioned preferable range (1 to 2 parts by mass) of sulfur.

If the content of the sulfur-based vulcanizing component is in the above range, the excellent characteristics of rubber such as flexibility, small compression set, resistance against flattening etc. can be provided to the roller body 4 by excellently vulcanizing the nitrile-butadiene rubber N contained in the base polymer.

As the sulfur-based vulcanizing component, any sulfur-containing accelerator having sulfur in the molecules thereof and functioning to accelerate vulcanization caused by sulfur and/or the sulfur-containing vulcanizing agent can be employed along with sulfur and/or the sulfur-containing vulcanizing agent.

Examples of the sulfur-containing accelerator include a thiazole-based accelerator, a thiuram-based accelerator, a sulfenamide-based accelerator, a dithiocarbamate-based accelerator and the like. A single type or not less than two types of such materials can be employed. Among the materials, the thiazole-based accelerator and the thiuram-based accelerator are preferably employed together.

Examples of the thiazole-based accelerator include 2-mercaptobenzothiazole (M), di-2-benzothiazolyl disulfide (DM), zinc salt of 2-mercaptobenzothiazole (MZ), cyclohexylamine salt of 2-mercaptobenzothiazole (HM, M60-OT), 2-(N,N-diethylthiocarbamoylthio)benzothiazole (64), 2-(4'-morpholinodithio)benzothiazole (DS, MDB) and the like. A single type or not less than two types of such materials can be employed. Among the materials, di-2-benzothiazolyl disulfide (DM) is preferably employed.

Examples of the thiuram-based accelerator include tetramethylthiuram monosulfide (TS), tetramethylthiuram disulfide (TT, TMT), tetraethylthiuram disulfide (TET), tetrabutylthiuram disulfide (TBT), tetrakis(2-ethylhexyl)thiuram disulfide (TOT-N), dipentamethylenethiuram tetrasulfide (TRA) and the like. A single type or not less than two types of such materials can be employed. Among the materials, tetramethylthiuram monosulfide (TS) is preferably employed.

The content of the thiazole-based accelerator is preferably 1 to 2 parts by mass with respect to 100 parts by mass of the base polymer in total, for example. The content of the thiuram-based accelerator is preferably 0.3 to 0.9 parts by mass with respect to 100 parts by mass of the base polymer in total, for example. If the contents of the thiazole-based accelerator and the thiuram-based accelerator are in the above ranges, an effect of accelerating vulcanization of the nitrile-butadiene rubber N with sulfur can be sufficiently attained in the system employing sulfur along with the thiazole-based accelerator and the thiuram-based accelerator, for example.

The semiconductive rubber composition forming the roller body 4 preferably further contains an ion-conductive agent, along with the aforementioned base polymer and the crosslinking component. Thus, the ion conductivity of the semiconductive rubber composition can be improved. Consequently, excellent semiconductivity for serving as a charging roller or a developing roller can be provided to the roller body 4.

The ion-conductive agent is preferably prepared from a hydrophobic ion-conductive agent, for example. The hydrophobic ion-conductive agent has no hygroscopicity. Therefore, the mass of the hydrophobic ion-conductive agent is not changed due to moisture absorption during measurement for addition to the semiconductive rubber composition, for example. Further, the hydrophobic ion-conductive agent is so easy to measure that the same can be prevented from dispersion in actual loading between batches.

Therefore, the semiconductive rubber composition can be inhibited from dispersion in ion conductivity per batch. Consequently, when a plurality of semiconductive rollers 1 are manufactured, semiconductivity of the plurality of semiconductive rollers 1 can be kept generally constant. Therefore, the quality of each semiconductive roller 1 can be improved.

In the semiconductive roller 1 containing the hydrophobic ion-conductive agent, there is no possibility that the electrical resistance indicating the semiconductivity remarkably fluctuates due to environmental change, particularly humidity change. Therefore, environment dependency of the roller resistance of the semiconductive roller 1 can be reduced.

As the hydrophobic ion-conductive agent, a hydrophobic one can be selected from various ion-conductive agents used as compounding ingredients for rubber or the like, for example. Further, the so-called ionic liquid containing no molecular solvent but made of only ions, noted as an electrolyte for a lithium secondary cell, can be employed, for example.

More specifically, the hydrophobic ion-conductive agent can be prepared from at least one material selected from a group consisting of tetrabutylammonium perchlorate and N-butyl-3-methylpyridinium•bistrifluoromethanesulfonylimide.

In the above materials, tetrabutylammonium perchlorate can be supplied as a solid such as powder.

N-butyl-3-methylpyridinium•bistrifluoromethanesulfonylimide is the so-called ionic liquid having cations of N-butyl-3-methylpyridinium (BMP+) and anions of bistrifluoromethanesulfonylimide (TFSI−) and containing no molecular solvent but made of only the above ions (cations and anions).

Another non-hydrophobic ion-conductive agent can also be employed as the ion-conductive agent. The non-hydrophobic ion-conductive agent can be prepared from salt (conductive salt) of anions having fluoro groups and sulfonyl groups and cations, for example.

Examples of the anions forming the conductive salt include fluoroalkylsulfonate ions, bis(fluoroalkylsulfonyl)imide ions, tris(fluoroalkylsulfonyl)methide ions and the like.

Examples of the cations forming the conductive salt include ions of alkaline metal such as sodium, lithium or potassium, ions of a group II element such as beryllium, magnesium, calcium, strontium or barium, ions of a transition element, cations of an amphoteric element, quaternary ammonium ions, imidazolium cations and the like.

As a combination of the aforementioned anions and cations, lithium salt prepared by combining anions and lithium ions is preferable, for example.

Examples of the lithium salt include $CF_3SO_3Li$, $C_4F_9SO_3Li$, $(CF_3SO_2)_2NLi$, $(C_2F_5SO_2)_2NLi$, $(C_4F_9SO_2)(CF_3SO_2)NLi$, $(FSO_2C_6F_4)(CF_3SO_2)NLi$, $(C_8F_{17}SO_2)(CF_3SO_2)(CF_3CH_2OSO_2)NLi$, $(CF_3CF_2CH_2OSO_2)_2NLi$, $(HCF_2CF_2CH_2OSO_2)_2NLi$, $[(CF_3)_2CHOSO_2]_2NLi$, $(CF_3SO_2)_3CLi$, $(CF_3CH_2OSO_2)_3CLi$ and the like. A single type or not less than two types of such materials can be employed.

Among the materials, $CF_3SO_3Li$ (lithium trifluoromethanesulfonate) and $(CF_3SO_2)_2NLi$ [bis(trifluoromethanesulfonyl)imide lithium] are preferable, and lithium trifluoromethanesulfonate is particularly preferable, in order to provide excellent ion conductivity to the semiconductive rubber composition.

When employing the non-hydrophobic ion-conductive agent, attention must be paid to the hygroscopicity thereof, as described above. The non-hydrophobic ion-conductive agent is sufficiently usable if the same is measured for preparing the semiconductive rubber composition in a thermo-hygrostatic measuring chamber, for example.

The content of the ion-conductive agent is preferably 0.1 to 1 part by mass with respect to 100 parts by mass of the base polymer in total, for example. If the content of the ion-conductive agent is in the above range, excellent semiconductivity for serving as a charging roller or a developing roller can be provided to the roller body 4 by improving the ion conductivity of the semiconductive rubber composition.

The semiconductive rubber composition forming the roller body 4 may further contain at least one additive selected from a group consisting of a supplement vulcanization accelerator, an acid acceptor, a processing aid, a filler, an age resistor, an antioxidant, an antiscorching agent, an ultraviolet absorber, a lubricant, a pigment, a flame retardant, a neutralizer and an antifoaming agent, along with the base polymer, the crosslinking component and the ion-conductive agent added if necessary.

Thus, processability and moldability can be improved when preparing the semiconductive rubber composition by blending the components therefor and kneading the mixture and molding the prepared semiconductive rubber composition into the shape of the roller body 4, for example. Further, the resistance and strength of the roller body 4 obtained by vulcanizing the molded semiconductive rubber composition can be improved. In addition, excellent characteristics of rubber such as flexibility, small compression set, resistance against flattening etc. can be provided to the roller body 4.

Examples of the supplement vulcanization accelerator include a metallic oxide such as zinc oxide and aliphatic acid such as stearic acid, oleic acid or cottonseed fatty acid and the like, for example. A single type or not less than two types of such materials can be employed.

The content of the supplement vulcanization assistant is preferably 3 to 7 parts by mass with respect to 100 parts by mass of the base polymer in total, for example.

The acid acceptor prevents chlorine-based gas, generated from the bicopolymer E in vulcanization of the semiconductive rubber composition, from remaining and staining a photosensitive drum. The aid acceptor is preferably prepared from hydrotalcite having excellent dispersibility in rubber, for example.

The content of the acid acceptor is preferably 1 to 5 parts by mass with respect to 100 parts by mass of the base polymer in total.

The processing aid can be prepared from aliphatic acid such as stearic acid, for example.

Examples of the filler include zinc oxide, silica, carbon black, clay, talc, calcium carbonate, magnesium carbonate, aluminum hydroxide, alumina and the like. Among the materials, carbon black can be preferably prepared from insulating or weak-conductive carbon black. Thus, dispersion in electrical resistance in the same roller body 4 can be reduced.

Examples of the antiscorching agent include N-cyclohexyl thiophthalimide, phthalic anhydride, N-nitrosodiphenylamine, 2,4-diphenyl-4-methyl-1-pentene and the like.

The remaining components can be prepared from arbitrary well-known compounds.

The semiconductive rubber composition forming the roller body 4 can be prepared similarly to the prior art. For example, the bicopolymer E containing epichlorohydrin and the nitrile-butadiene rubber N are blended in a prescribed ratio and masticated. Then, the additives other than the crosslinking component are added to the mixture and kneaded. Then, the crosslinking component is added to the mixture and kneaded, whereby the semiconductive rubber composition can be prepared.

A kneader, a Banbury mixer, an extruder or the like can be employed for the kneading, for example.

The shaft 5 provided on the semiconductive roller 1 is integrally formed by metal such as aluminum, an aluminum alloy, stainless steel or the like, for example. The roller body 4 and the shaft 5 are electrically bonded to and mechanically fixed to each other with a conductive adhesive or the like, for example. Thus, the roller body 4 and the shaft 5 can be integrally rotated.

The oxide film 6 is formed by oxidation of the semiconductive rubber composition resulting from ultraviolet irradiation of the semiconductive rubber composition forming the roller body 4. The oxide film 6 covers the overall outer peripheral surface 2 of the roller body 4 with a uniform thickness.

The aforementioned semiconductive roller 1 can be manufactured by the following method, for example:

In order to manufacture the semiconductive roller 1, the semiconductive rubber composition is first prepared in the aforementioned manner, and the roller body 4 is prepared from the semiconductive rubber composition by a well-known method, for example. More specifically, the semiconductive rubber composition is kneaded and melted by heating in an extruder. Then, the melted semiconductive rubber composition is passed through a die corresponding to the (annular) sectional shape of the roller body 4, to be extruded into a long cylinder. Thus, the roller body 4 having the through-hole 3 is obtained. Then, the obtained roller body 4 is hardened by cooling, a tentative shaft for vulcanization is thereafter inserted into the through-hole 3, and the roller body 4 is heated in a vulcanizer to be Vulcanized.

Then, the shaft 5 coated with a conductive adhesive on the outer peripheral surface thereof is inserted into the through-hole 3 of the roller body 4, in place of the tentative shaft. If the adhesive is a thermosetting adhesive, the thermosetting adhesive is hardened by heating, thereby electrically bonding and mechanically fixing the shaft 5 to the roller body 4.

Thereafter the outer peripheral surface 2 of the roller body 4 is polished to reach prescribed surface roughness, if necessary. Then, the outer peripheral surface 2 of the roller body 4 is irradiated with ultraviolet light, thereby oxidizing the nitrile-butadiene rubber N contained in the crosslinked substance of the semiconductive rubber composition constituting the outer peripheral surface 2. Thus, the oxide film 6 is formed to cover the outer peripheral surface 2. The semiconductive roller 1 shown in FIG. 1 is manufactured through the aforementioned steps.

The semiconductive roller 1 obtained in the aforementioned manner can be preferably applied to a charging roller for an image forming apparatus such as a laser printer utilizing electrophotography, for example.

Figure 2:
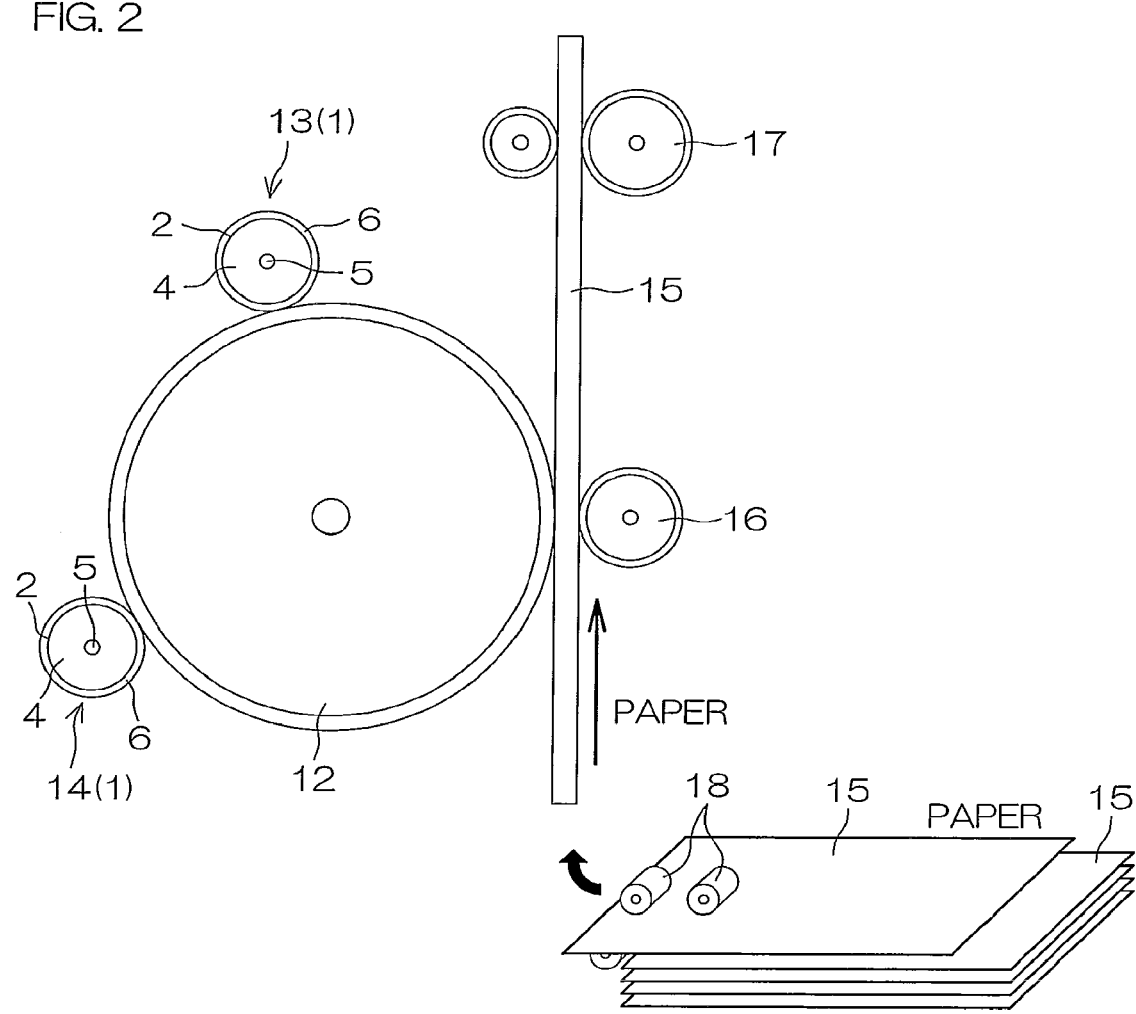
FIG. 2 is a schematic block diagram of an electrophotographic apparatus according to the embodiment of the present invention.

FIG. 2 is a schematic block diagram of an electrophotographic apparatus according to the embodiment of the present invention.

An electrophotographic apparatus 11 includes a photosensitive drum 12, a charging roller 13 in contact with the surface of the photosensitive drum 12 for charging the photosensitive drum 14, a developing roller 14 in contact with the surface of the photosensitive drum 14 for sticking a toner to the surface of the photosensitive drum 12, a transfer roller 16 for transferring the toner to papers 15, a fixing roller 17 for fixing the toner on the papers 15 to the papers 15, and paper feed rollers 18.

According to this embodiment, the semiconductive rollers 1 shown in FIG. 1 are built into the electrophotographic apparatus 11 as the charging roller 13 and the developing roller 14.

The oxide films 6 are formed on the outer peripheral surfaces 2 of the roller bodies 4 of the semiconductive rollers 1 (the charging roller 13 and the developing roller 14) by oxidizing the outer peripheral surfaces 2 made of crosslinked substances of the semiconductive rubber composition.

Therefore, staining of the photosensitive drum 12 (the photosensitive body) resulting from bleeding of the components of the semiconductive rubber composition on the outer peripheral surfaces 2 and influence exerted on formed images due to accumulation of toner additives (silica etc.) on the outer peripheral surfaces 2 can be prevented.

When a stain resistance test is conducted with the semiconductive rollers 1 having the oxide films 6, influence exerted on formed images can be prevented. The stain resistance test is conducted by investigating whether or not images formed with the photosensitive drum 12 are influenced when the semiconductive rollers 1 are stood still in an environment having a temperature of 50° C. and relative humidity of 90% for 30 days while the outer peripheral surfaces 2 of the roller bodies 4 are brought into contact with the photosensitive drum 12, for example.

Therefore, the electrophotographic apparatus 11 having the semiconductive rollers 1 built thereinto as the charging roller 13 and the developing roller 14 can regularly form excellent images while preventing the photosensitive drum 12 from staining.

The roller resistance of the semiconductive roller 1 employed as the charging roller 13 is preferably not less than $10^5 \Omega$ and less than $10^7 \Omega$. If the roller resistance is less than $10^5 \Omega$ or not less than $10^7 \Omega$, the formed images may be irregularized. If the roller resistance is extremely out of the above range, halftone images may not be formable.

In other words, the surface of the photosensitive drum 12 cannot be properly charged if the roller resistance of the semiconductive roller 1 is excessively high or low. Therefore, the toner may not at all be stuck to the photosensitive drum 12 in a developing step. Further, only solid images may be output despite formation of halftone images.

Figure 3:
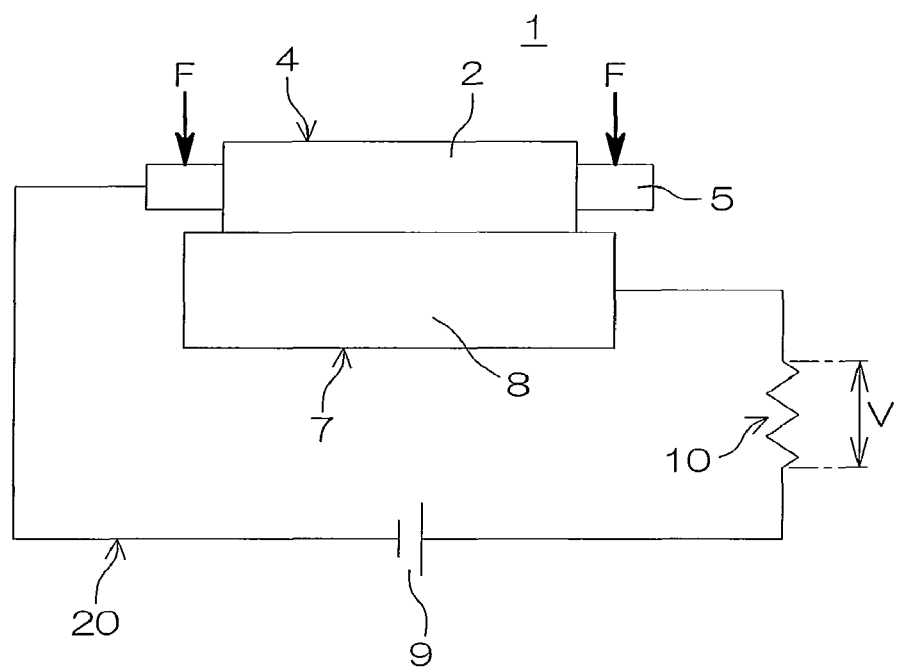
FIG. 3 illustrates a method of measuring roller resistance of the semiconductive roller shown in FIG. 1.

The roller resistance of the semiconductive roller 1, in the state provided with the oxide film 6 on the outer peripheral surface of the roller body 4, can be measured as follows:

FIG. 3 illustrates a method of measuring the roller resistance of the semiconductive roller 1 shown in FIG. 1.

In this embodiment, the roller resistance of the semiconductive roller 1 is expressed by a value measured in the following manner:

The roller resistance of the semiconductive roller 1 is measured in a normal-temperature normal-humidity environment having a temperature of 23±1° C. and relative humidity of 55±1%.

In order to measure the roller resistance, an aluminum drum 7 rotatable at a constant rotational speed is first prepared, for example. Then, the outer peripheral surface 2 (the surface of the oxide film 6) of the semiconductive roller 1 whose roller resistance is to be measured is brought into contact with an outer peripheral surface 8 of the aluminum drum 7 from above.

Then, a DC power supply 9 and a resistor 10 are serially connected between the shaft 5 of the semiconductive roller 1 and the aluminum drum 7, thereby forming a measuring circuit 20. The (−) side and the (+) side of the DC power supply 9 are connected with the shaft 5 and the resistor 10 respectively. The resistance r of the resistor 10 is set to 100Ω.

Then, loads F of 450 g are applied to both end portions of the shaft 5 respectively, thereby bringing the roller body 4 into pressure contact with the aluminum drum 7. In this state, a direct voltage E of 500 V is applied between the shaft 5 and the aluminum drum 7 from the DC power supply 9 while rotating the aluminum drum 7 (at a rotational frequency of 40 rpm), for measuring a detected voltage V applied to the resistor 10.

From the detected voltage V and the applied voltage E (=500 V), the roller resistance R of the semiconductive roller 1 is basically obtained according to the following equation (1'):

$$R = r \times E/(V-r) \quad (1')$$

However, the term—r in the denominator of the equation (1') can be regarded as minute, and hence a value obtained according to the following equation (1) is assumed to be the roller resistance R of the semiconductive roller 1 in this embodiment.

$$R = r \times E/V \quad (1)$$

While the embodiment of the present invention has been described, the present invention may be embodied in other ways.

For example, the roller body 4 can be adjusted to have arbitrary hardness and arbitrary compression set, in response to the application of the semiconductive roller 1 etc. In order to adjust the hardness and the compression set of the roller body 4, the roller resistance etc., the mass ratio E/N of the bicopolymer E containing epichlorohydrin and the nitrile-butadiene rubber N may be adjusted in the aforementioned range, or the types and the quantities of the thiourea-based crosslinking component and the sulfur-based vulcanizing component as the crosslinking component may be adjusted.

For example, the roller body 4 may have a two-layer structure including an outer layer on the side of the outer peripheral surface 2 and an inner layer on the side of the shaft 5. In this case, at least the outer layer may be made of the semiconductive rubber composition described in the above embodiment.

The electrophotographic apparatus 11 may be formed by an image forming apparatus such as a laser printer, an electrostatic copier, a plain paper facsimile or a composite apparatus thereof, for example, utilizing electrophotography.

The semiconductive roller 1 can be employed as a charging roller, a developing roller, a transfer roller, a cleaning roller or the like for such an image forming apparatus.

Further, various modifications in design may be applied in the range not deviating from the subject matter of the present invention.

EXAMPLES

While the present invention is now described with reference to Examples and comparative examples, the present invention is not restricted to the following Examples.

Semiconductive rollers according to the following Examples and comparative examples were manufactured and tested in an environment having a temperature of 23±1° C. and relative humidity of 55±1%, unless otherwise stated.

Example 1

60 parts by mass of an epichlorohydrin-ethylene oxide bicopolymer [ECO, Epichromer (registered trademark) D by Daiso Co., Ltd., ethylene oxide content: 61 mole %] and 40 parts by mass of nitrile-butadiene rubber [JSR N250 SL by JSR Corporation, low nitrile NBR, acrylonitrile content: 20%] as the base polymer were masticated in a 9L-kneader and components shown in the following Table 1 were added to the mixture, which in turn was further kneaded to prepare a semiconductive rubber composition. The mass ratio E/N in the base polymer was 60/40.

TABLE 1

| Component | | Parts by Mass |
|---|---|---|
| Sulfur-Based Vulcanizing Component | Powdered Sulfur | 1.50 |
| | Accelerator DM | 1.50 |
| | Accelerator TS | 0.50 |
| Thiourea-Based Crosslinking Component | Thiourea-Based Crosslinking Agent | 0.60 |
| | Accelerator DT | 0.54 |
| Others | Two Types of Zinc Oxide | 5 |
| | Acid Acceptor | 3 |

The components in Table 1 are as follows:
Powdered sulfur: vulcanizing agent [by Tsurumi Chemical Co., Ltd.]

Sulfur-containing accelerator DM: di-2-benzothiazolyl disulfide [thiazole-based accelerator, Nocceler (registered trademark) DM by Ouchi Shinko Chemical Industrial]

Sulfur-containing accelerator TS: tetramethylthiuram monosulfide [thiuram-based accelerator, Nocceler TS by Ouchi Shinko Chemical Industrial]

Thiourea-based crosslinking agent: ethylene thiourea [Axel (registered trademark) 22-S by Kawaguchi Chemical Industry Co., Ltd.]

Crosslinking accelerator DT: 1,3-di-o-tolylguanidine [guanidine-based accelerator, Nocceler DT by Ouchi Shinko Chemical Industrial]

Two types of zinc oxide: crosslinking assistants [by Mitsui Mining and Smelting Co., Ltd.]

Acid acceptor: hydrotalcite [DHT-4A (registered trademark)-2 by Kyowa Chemical Industry Co., Ltd.]

Parts by mass in Table 1 are those per 100 parts by mass of the base polymer.

After the preparation of the semiconductive rubber composition, a roller body was molded by supplying the semiconductive rubber composition to an extruder of ϕ60 and extruding the same into a cylinder of ϕ13.0 mm in outer diameter and ϕ5.5 mm in inner diameter. Thereafter a tentative shaft of ϕ3 mm in outer diameter for vulcanization was inserted into a through-hole of the roller body, which in turn was vulcanized in a vulcanizer at 160° C. for 30 minutes.

Then, a shaft of ϕ6 mm in outer diameter having an outer peripheral surface coated with a conductive thermosetting adhesive was mounted on the roller body in place of the tentative shaft, and bonded thereto by heating in an oven at 150° C. for 60 minutes. Thereafter both ends of the roller body were cut, and the outer peripheral surface of the roller body was polished with a wide grinder until the outer diameter of the roller body reached ϕ12.0 mm.

After the polished outer peripheral surface was wiped with alcohol, the roller body was set on a UV treating apparatus so that the distance between a UV light source and the outer peripheral surface was 50 mm, and the outer peripheral surface of the roller body was irradiated with ultraviolet light for 15 minutes while rotating the roller body at 30 rpm. Thus, a semiconductive roller was manufactured by forming an oxide film on the outer peripheral surface of the roller body.

Example 2

A semiconductive roller was manufactured by preparing a semiconductive rubber composition similarly to Example 1, except that the mass ratio E/N in the base polymer was set to 50/50 by setting the quantities of the epichlorohydrin-ethylene oxide biopolymer and the nitrile-butadiene rubber in the base polymer to 50 parts by mass and 50 parts by mass respectively.

Example 3

A semiconductive roller was manufactured by preparing a semiconductive rubber composition similarly to Example 1, except that the mass ratio E/N in the base polymer was set to 80/20 by setting the quantities of the epichlorohydrin-ethylene oxide biopolymer and the nitrile-butadiene rubber in the base polymer to 80 parts by mass and 20 parts by mass respectively.

Example 4

A semiconductive roller was manufactured by preparing a semiconductive rubber composition similarly to Example 1, except that 0.5 parts by mass of lithium trifluoromethanesulfonate [TFMS, by Morita Chemical Industries Co., Ltd.] as an ion-conductive agent was further added as the raw material for the semiconductive rubber composition.

Example 5

A semiconductive roller was manufactured by preparing a semiconductive rubber composition similarly to Example 1, except that 0.8 parts by mass of tetrabutylammonium perchlorate [TBAP, QAP-01 by Japan Carlit Co., Ltd.] as a hydrophobic ion-conductive agent was further added as the raw material for the semiconductive rubber composition.

Example 6

A semiconductive roller was manufactured by preparing a semiconductive rubber composition similarly to Example 1, except that 0.6 parts by mass of N-butyl-3-methylpyridinium•bistrifluoromethanesulfonylimide [BMP•TFSI, by Japan Carlit Co., Ltd.] as a hydrophobic ion-conductive agent was further added as the raw material for the semiconductive rubber composition.

Comparative Example 1

A semiconductive roller was manufactured by preparing a semiconductive rubber composition similarly to Example 1, except that the outer peripheral surface of the roller body was not irradiated with ultraviolet light.

Comparative Example 2

A semiconductive roller was manufactured by preparing a semiconductive rubber composition similarly to Example 1, except that 10 parts by mass of conductive carbon black [Denka Black (registered trademark) by Denki Kagaku Kogyo K. K.] was further added as the raw material for the semiconductive rubber composition.

Comparative Example 3

A semiconductive roller was manufactured by preparing a semiconductive rubber composition similarly to Example 1, except that the mass ratio E/N in the base polymer was set to 45/55 by setting the quantities of the epichlorohydrin-ethylene oxide biopolymer and the nitrile-butadiene rubber in the base polymer to 45 parts by mass and 55 parts by mass respectively.

Comparative Example 4

A semiconductive roller was manufactured by preparing a semiconductive rubber composition similarly to Example 1, except that the mass ratio E/N in the base polymer was set to 85/15 by setting the quantities of the epichlorohydrin-ethylene oxide biopolymer and the nitrile-butadiene rubber in the base polymer to 85 parts by mass and 15 parts by mass respectively.

Comparative Example 5

A semiconductive roller was manufactured by preparing a semiconductive rubber composition similarly to Example 1, except that neither sulfur as the sulfur-based vulcanizing component nor the sulfur-containing accelerators DM and TS were blended.

Comparative Example 6

A semiconductive roller was manufactured by preparing a semiconductive rubber composition similarly to Example 1, except that neither the thiourea-based crosslinking agent as the thiourea-based crosslinking component nor the crosslinking accelerator DT was blended.

Comparative Example 7

A semiconductive roller was manufactured by preparing a semiconductive rubber composition similarly to Example 1, except that 0.50 parts by mass of a peroxide-based crosslinking agent [dicumyl peroxide, Percumyl (registered trademark) D by NOF Corporation] was further added as the raw material for the semiconductive rubber composition.

Comparative Example 8

A semiconductive roller was manufactured by preparing a semiconductive rubber composition similarly to Example 1, except that neither the thiourea-based crosslinking agent as the thiourea-based crosslinking component nor the crosslinking accelerator DT was blended but 0.50 parts by mass of a peroxide-based crosslinking agent [dicumyl peroxide, Percumyl D by NOF Corporation] was substitutionally added.

Comparative Example 9

A semiconductive roller was manufactured by preparing a semiconductive rubber composition similarly to Example 1, except that neither the thiourea-based crosslinking agent as the thiourea-based crosslinking component, nor the crosslinking accelerator DT, nor sulfur as the sulfur-based vulcanizing component nor the sulfur-containing accelerators DM and TS were blended but 1.00 part by mass of a peroxide-based crosslinking agent [dicumyl peroxide, Percumyl D by NOF Corporation] was substitutionally added.

Comparative Example 10

A semiconductive roller was manufactured by preparing a semiconductive rubber composition similarly to Example 1, except that 40 parts by mass of chloroprene rubber [CR, Shoprene (registered trademark) WRT by Showa Denko, K. K.] was employed in place of the nitrile-butadiene rubber in the base polymer.

Comparative Example 11

A semiconductive roller was manufactured by preparing a semiconductive rubber composition similarly to comparative example 10, except that neither sulfur as the sulfur-based vulcanizing component nor the sulfur-containing accelerators DM and TS were blended.

Comparative Example 12

A semiconductive roller was manufactured by preparing a semiconductive rubber composition similarly to comparative example 10, except that neither the thiourea-based crosslinking agent as the thiourea-based crosslinking component nor the crosslinking accelerator DT was blended.

Comparative Example 13

A semiconductive roller was manufactured by preparing a semiconductive rubber composition similarly to Example 1, except that 60 parts by mass of an epichlorohydrin-ethylene oxide-allyl glycidyl ether tricopolymer [GECO, Epion (registered trademark) 301 by Daiso Co., Ltd.] and 40 parts by mass of chloroprene rubber [CR, Shoprene (registered trademark) WRT by Showa Denko, K. K.] were employed as the base polymer.

Comparative Example 14

A semiconductive roller was manufactured by preparing a semiconductive rubber composition similarly to comparative example 13, except that neither sulfur as the sulfur-based vulcanizing component nor the sulfur-containing accelerators DM and TS were blended.

Comparative Example 15

A semiconductive roller was manufactured by preparing a semiconductive rubber composition similarly to comparative example 13, except that neither the thiourea-based crosslinking agent as the thiourea-based crosslinking component nor the crosslinking accelerator DT was blended.

Comparative Example 16

A semiconductive roller was manufactured by preparing a semiconductive rubber composition similarly to Example 1, except that 60 parts by mass of an epichlorohydrin-ethylene oxide-allyl glycidyl ether tricopolymer [GECO, Epion 301 by Daiso Co., Ltd.] was employed in place of the epichlorohydrin-ethylene oxide bicopolymer in the base polymer.

Comparative Example 17

A semiconductive roller was manufactured by preparing a semiconductive rubber composition similarly to comparative example 16, except that neither sulfur as the sulfur-based vulcanizing component nor the sulfur-containing accelerators DM and TS were blended but 0.50 parts by mass of a peroxide-based crosslinking agent [dicumyl peroxide, Percumyl D by NOF Corporation] was substitutionally added.

Comparative Example 18

A semiconductive roller was manufactured by preparing a semiconductive rubber composition similarly to comparative example 16, except that neither the thiourea-based crosslinking agent as the thiourea-based crosslinking component nor the crosslinking accelerator DT was blended but 0.50 parts by mass of a peroxide-based crosslinking agent [dicumylperoxide, Percumyl D by NOF Corporation] was substitutionally added.

<Evaluation>

(1) Measurement of Roller Resistance

The roller resistance of the semiconductive roller in the process of manufacturing according to each of the aforementioned Examples and comparative examples was measured in a normal-temperature normal-humidity environment having a temperature of 23±1° C. and relative humidity of 55±1% by the method described in the above embodiment.

The roller resistance was evaluated as excellent when the same was less than $10^7 \Omega$, and evaluated as defective when the same was not less than $10^7 \Omega$. Tables 2 to 4 show the roller resistance in logR values.

(2) Lab Test

The semiconductive roller manufactured according to each of the aforementioned Examples and comparative examples was built into a toner cartridge [image drum ID-C4DC by Oki Data Corporation, cyan] for a laser printer having a photosensitive drum therein as a charging roller, in place of a pure charging roller arranged regularly in contact with the surface of the photosensitive drum.

Then, the toner cartridge was mounted on a color laser printer [C5900dn by Oki Data Corporation] and immediately thereafter employed for printing halftone images and solid images, which in turn were evaluated as initial images.

Then, 2000 papers a day were fed through the color laser printer for seven days, and the color laser printer was thereafter employed again for printing halftone images and solid images, which in turn were evaluated as images after paper feeding.

The images were evaluated as "×" when some abnormality was observed therein, and evaluated as "○" when no abnormality was observed therein.

Further, the toner cartridge was stood still in an environment having a temperature of 50° C. and relative humidity of 90% for 30 days, and thereafter built into the color laser printer for printing halftone images and solid images. Then, a photosensitive body exhibiting a streaky image defective on a position having been in contact with the semiconductive roller in the still standing was evaluated as "stained", and that exhibiting no such defective was evaluated as "not stained".

Tables 2 to 4 show the results. The roller resistance of the semiconductive roller according to comparative example 3 was so high that it was impossible to form excellent halftone images already in an initial stage, and hence no lab test was conducted on comparative example 3.

TABLE 2

|  |  | Comp Ex. 1 | Comp Ex. 2 | Comp Ex. 3 | Ex. 2 | Ex. 1 | Ex. 3 | Comp Ex. 4 | Ex. 4 |
|---|---|---|---|---|---|---|---|---|---|
| Base Polymer | ECO | 60 | 60 | 45 | 50 | 60 | 80 | 85 | 60 |
|  | GECO | — | — | — | — | — | — | — | — |
|  | CR | — | — | — | — | — | — | — | — |
|  | NBR | 40 | 40 | 55 | 50 | 40 | 20 | 15 | 40 |
| Sulfur-Based Vulcanizing Component | Powdered Sulfer | 1.50 | 1.50 | 1.50 | 1.50 | 1.50 | 1.50 | 1.50 | 1.50 |
|  | Accelerator DM | 1.50 | 1.50 | 1.50 | 1.50 | 1.50 | 1.50 | 1.50 | 1.50 |
|  | Accelerator TS | 0.50 | 0.50 | 0.50 | 0.50 | 0.50 | 0.50 | 0.50 | 0.50 |
| Thiourea-Based Crosslinking Component | Thiourea-Based Crosslinking Component | 0.60 | 0.60 | 0.60 | 0.60 | 0.60 | 0.60 | 0.60 | 0.60 |
|  | Accelerator DT | 0.54 | 0.54 | 0.54 | 0.54 | 0.54 | 0.54 | 0.54 | 0.54 |
| Other Crosslinking Component | Peroxide | — | — | — | — | — | — | — | — |
| Ion-Conductive Agent | TFMS | — | — | — | — | — | — | — | 0.5 |
|  | TBAP | — | — | — | — | — | — | — | — |
|  | BMP · TFSI | — | — | — | — | — | — | — | — |
| Others | Two Types of Zinc Oxide | 5 | 5 | 5 | 5 | 5 | 5 | 5 | 5 |
|  | Acid Acceptor | 3 | 3 | 3 | 3 | 3 | 3 | 3 | 3 |
|  | Carbon Black | — | 10 | — | — | — | — | — | — |
| Ultraviolet Irradiation |  | Not Stained | Stained | Stained | Stained | Stained | Stained | Stained | Stained |
| Roller Resistance logR (23 ± 1 C.° × 55 ± 1% RH) |  | 5.8 | 5.5 | 7.0 | 6.6 | 6.2 | 5.9 | 5.8 | 5.6 |
| Lab Test | Initial Image | ○ | ×[*2] | — | ○ | ○ | ○ | ○ | ○ |
|  | Image after Paper Feeding | ×[*1] | × | — | ○ | ○ | ○ | × | ○ |
|  | Staining of Photosensitive Body | Not Stained | Not Stained | — | Not Stained | Not Stained | Not Stained | Not Stained | Not Stained |

[*1] No oxide film was formed on the outer peripheral surface of the semiconductive roller, and hence the additive in the toner adhered to the fed papers to cause irregularity in the images.
[*2] The images were irregularized due to dispersion in electrical resistance in the same roller body.

TABLE 3

|  |  | Ex. 5 | Ex. 6 | Comp Ex. 5 | Comp Ex. 6 | Comp Ex. 7 | Comp Ex. 8 | Comp Ex. 9 | Comp Ex. 10 |
|---|---|---|---|---|---|---|---|---|---|
| Base Polymer | ECO | 60 | 60 | 60 | 60 | 60 | 60 | 60 | 60 |
|  | GECO | — | — | — | — | — | — | — | — |
|  | CR | — | — | — | — | — | — | — | 40 |
|  | NBR | 40 | 40 | 40 | 40 | 40 | 40 | 40 | — |
| Sulfur-Based Vulcanizing Component | Powdered Sulfer | 1.50 | 1.50 | — | 1.50 | 1.50 | 1.50 | — | 1.50 |
|  | Accelerator DM | 1.50 | 1.50 | — | 1.50 | 1.50 | 1.50 | — | 1.50 |
|  | Accelerator TS | 0.50 | 0.50 | — | 0.50 | 0.50 | 0.50 | — | 0.50 |
| Thiourea-Based Crosslinking Component | Thiourea-Based Crosslinking Component | 0.60 | 0.60 | 0.60 | — | 0.60 | — | — | 0.60 |
|  | Accelerator DT | 0.54 | 0.54 | 0.54 | — | 0.54 | — | — | 0.54 |

TABLE 3-continued

|  |  | Ex. 5 | Ex. 6 | Comp Ex. 5 | Comp Ex. 6 | Comp Ex. 7 | Comp Ex. 8 | Comp Ex. 9 | Comp Ex. 10 |
|---|---|---|---|---|---|---|---|---|---|
| Other Crosslinking Component | Peroxide | — | — | — | — | 0.50 | 0.50 | 1.00 | — |
| Ion-Conductive Agent | TFMS | — | — | — | — | — | — | — | — |
|  | TBAP | 0.8 | — | — | — | — | — | — | — |
|  | BMP · TFSI | — | 0.6 | — | — | — | — | — | — |
| Others | Two Types of Zinc Oxide | 5 | 5 | 5 | 5 | 5 | 5 | 5 | 5 |
|  | Acid Acceptor | 3 | 3 | 3 | 3 | 3 | 3 | 3 | 3 |
|  | Carbon Black | — | — | — | — | — | — | — | — |
| Ultraviolet Irradiation |  | Stained | Stained | Stained | Stained | Stained | Stained | Stained | Stained |
| Roller Resistance logR (23 ± 1 C.° × 55 ± 1% RH) |  | 5.7 | 5.6 | 6.0 | 6.0 | 6.1 | 5.9 | 6.0 | 5.8 |
| Lab Test | Initial Image | ○ | ○ | ○ | ○ | ○ | ○ | ○ | ○ |
|  | Image after Paper Feeding | ○ | ○ | ○ | ○ | ○ | ○ | ○ | ○ |
|  | Staining of Photosensitive Body | Not Stained | Not Stained | Stained | Stained | Stained | Stained | Stained | Stained |

TABLE 4

|  |  | Comp Ex. 11 | Comp Ex. 12 | Comp Ex. 13 | Comp Ex. 14 | Comp Ex. 15 | Comp Ex. 16 | Comp Ex. 17 | Comp Ex. 18 |
|---|---|---|---|---|---|---|---|---|---|
| Base Polymer | ECO | 60 | 60 | — | — | — | — | — | — |
|  | GECO | — | — | 60 | 60 | 60 | 60 | 60 | 60 |
|  | CR | 40 | 40 | 40 | 40 | 40 | — | — | — |
|  | NBR | — | — | — | — | — | 40 | 40 | 40 |
| Sulfur-Based Vulcanizing Component | Powdered Sulfer | — | 1.50 | 1.50 | — | 1.50 | 1.50 | — | 1.50 |
|  | Accelerator DM | — | 1.50 | 1.50 | — | 1.50 | 1.50 | — | 1.50 |
|  | Accelerator TS | — | 0.50 | 0.50 | — | 0.50 | 0.50 | — | 0.50 |
| Thiourea-Based Crosslinking Component | Thiourea-Based Crosslinking Component | 0.60 | — | 0.60 | 0.60 | — | 0.60 | 0.60 | — |
|  | Accelerator DT | 0.54 | — | 0.54 | 0.54 | — | 0.54 | 0.54 | — |
| Other Crosslinking Component | Peroxide | — | — | — | — | — | — | 0.50 | 0.50 |
| Ion-Conductive Agent | TFMS | — | — | — | — | — | — | — | — |
|  | TBAP | — | — | — | — | — | — | — | — |
|  | BMP · TFSI | — | — | — | — | — | — | — | — |
| Others | Two Types of Zinc Oxide | 5 | 5 | 5 | 5 | 5 | 5 | 5 | 5 |
|  | Acid Acceptor | 3 | 3 | 3 | 3 | 3 | 3 | 3 | 3 |
|  | Carbon Black | — | — | — | — | — | — | — | — |
| Ultraviolet Irradiation |  | Stained | Stained | Stained | Stained | Stained | Stained | Stained | Stained |
| Roller Resistance logR (23 ± 1 C.° × 55 ± 1% RH) |  | 5.6 | 5.6 | 5.5 | 5.3 | 5.3 | 6.0 | 5.8 | 5.8 |
| Lab Test | Initial Image | ○ | ○ | ○ | ○ | ○ | ○ | ○ | ○ |
|  | Image after Paper Feeding | ○ | ○ | ○ | ○ | ○ | ○ | ○ | ○ |
|  | Staining of Photosensitive Body | Stained | Stained | Stained | Stained | Stained | Stained | Stained | Stained |

It has been realized from the results of comparative example 1 and Examples 1 to 6 shown in Table 2 that an additive such as silica added to a toner was accumulated on the outer peripheral surface of the roller body to cause irregularities in the images after the paper feeding test in the semiconductive roller according to comparative example 1, having no oxide film formed on the outer peripheral surface of the roller body by ultraviolet irradiation.

It has been realized from the results of comparative example 2 and Examples 1 to 6 that the semiconductive roller according to comparative example 2 containing conductive carbon black caused irregularities in the images due to dispersion in electrical resistance in the same roller body.

It has been realized from the results of comparative example 3 and Examples 1 to 6 that the roller resistance was so high that no excellent semiconductivity was providable to the semiconductive roller when the quantity of the epichlorohydrin-ethylene oxide bicopolymer in the base polymer was less than the mass ratio E/N=50/50. Therefore, it has been realized that no excellent halftone images can be formed when such as semiconductive roller is used as a charging roller, as described above.

It has been realized from the results of comparative example 4 and Examples 1 to 6 that no excellent oxide film sufficiently functionable as a protective film was formed on the outer peripheral surface of the roller body when the quantity of the epichlorohydrin-ethylene oxide bicopolymer in the base polymer was greater than the mass ratio E/N=80/20. Therefore, it has been realized that the additive such as silica added to the toner is accumulated on the outer peripheral surface of the roller body to cause irregularities in the images after the paper feeding test in this case.

Further, it has been realized from the results of comparative examples 5 to 18 shown in Tables 3 and 4 and Examples 1 to 6 shown in Table 2 that only the two types of materials, i.e., the bicopolymer containing epichlorohydrin such as the epichlorohydrin-ethylene oxide bicopolymer and the nitrile-butadiene rubber must be employed together as the base polymer and that only the thiourea-based crosslinking component and the sulfur-based vulcanizing component must be employed together as the crosslinking component in order to prevent staining of the photosensitive body etc. by forming an excellent oxide film sufficiently functionable as a protective film on the outer peripheral surface of the roller body.

In addition, it has been realized from the results of Examples 1 to 6 that the mass ratio E/N must be in the range of 50/50 to 80/20 and that more excellent semiconductivity can be provided to the roller body by adding the ion-conductive agent.

(3) Evaluation of Measurability

When the raw material components were measured and blended for preparing the semiconductive rubber compositions according to Examples 4 to 6, the mass of lithium trifluoromethanesulfonate employed as the ion-conductive agent in Example 4 was easily changed due to moisture absorption during the measurement. Consequently, the material may have been easily measurable, and required a countermeasure such as measurement in a thermo-hygrostatic measuring chamber, for example.

On the other hand, the mass of the ion-conductive agent was not changed due to moisture absorption during the measurement in Example 5 or 6 employing hydrophobic tetrabutylammonium perchlorate or N-butyl-3-methylpyridinium•bistrifluoromethane sulfonyl imide as the ion-conductive agent. Consequently, it has been realized that the ion-conductive agent was so easily measurable that the same did not require the countermeasure.

(4) Evaluation of Environment Dependency of Roller Resistance

The roller resistance of the semiconductive roller manufactured according to each of Examples 4 to 6 was measured in a low-temperature low-humidity environment (LL) having a temperature of 10±1° C. and relative humidity of 20±1% and a high-temperature high-humidity environment (HH) having a temperature of 30±1° C. and relative humidity of 80±1% by the method described in the aforementioned embodiment. Further, the ratio $R_{LL}/R_{HH}$ of the roller resistance $R_{LL}$ in the low-temperature low-humidity environment and the roller resistance $R_{HH}$ in the high-temperature high-humidity environment was obtained from the results of the measurement. Table 5 shows the results along with the measurement results in the aforementioned normal-temperature normal-humidity environment (NN) having the temperature of 23±1° C. and the relative humidity of 55±1%.

TABLE 5

|  |  | Ex. 4 | Ex. 5 | Ex. 6 |
|---|---|---|---|---|
| Electrical Resistance logR | 10 ± 1 C. ° × 20 ± 1% RH (LL) | 6.6 | 6.4 | 6.4 |
|  | 23 ± 1 C. ° × 55 ± 1% RH (NN) | 5.6 | 5.7 | 5.6 |
|  | 30 ± 1 C. ° × 80 ± 1% RH (HH) | 5.1 | 5.4 | 5.3 |
| Ratio $R_{LL}/R_{HH}$ of Electrical Resistance |  | 31.6 | 10.0 | 12.6 |

It has been realized from Table 5 that the environment dependency of the roller resistance of the semiconductive roller can be reduced by employing hydrophobic tetrabutylammonium perchlorate or N-butyl-3-methylpyridinium•bistrifluoromethane sulfonyl imide as the ion-conductive agent.

While the present invention has been described in detail by way of the embodiments thereof, it should be understood that these embodiments are merely illustrative of the technical principles of the present invention but not limitative of the invention. The spirit and scope of the present invention are to be limited only by the appended claims.

This application corresponds to Japanese Patent Application No. 2010-110276 filed with the Japan Patent Office on May 12, 2010 and Japanese Patent Application No. 2010-213725 filed with the Japan Patent Office on Sep. 24, 2010, the disclosures of which are incorporated herein by reference.

What is claimed is:

1. A semiconductive roller comprising: a roller body having an outer peripheral surface made of a semiconductive rubber composition; and an oxide film formed by ultraviolet irradiation covering the outer peripheral surface of the roller body, wherein
   the semiconductive rubber composition contains a base polymer, a crosslinking component for crosslinking the base polymer, 3 to 7 parts by mass based on 100 parts by mass of the base polymer of a metallic oxide or aliphatic acid vulcanization accelerator, and 1 to 5 parts by mass based on 100 parts by mass of the base polymer of an acid acceptor,
   the base polymer is a mixture of a bicopolymer E containing epichlorohydrin and nitrile-butadiene rubber N, while the mass ratio E/N of the bicopolymer E and the nitrile-butadiene rubber N in the mixture is 50/50 to 80/20, and
   the crosslinking component includes
      (i) 0.3 to 1 part by mass with respect to 100 parts by mass of the base polymer of a thiourea-based crosslinking agent and 0.3 to 1 part by mass based on 100 parts by mass of the base polymer of a guanidine-based crosslinking accelerator for crosslinking the bicopolymer E, and
      (ii) a sulfur-based vulcanizing component for vulcanizing the nitrile-butadiene rubber N, which sulfur-based vulcanizing component provides 1 to 2 parts by mass based on 100 parts by mass of the base polymer of sulfur and which sulfur-based vulcanizing component comprises 1 to 2 parts by mass based on 100 parts by mass of the base polymer of a thiazole-based vulcanization accelerator and 0.3 to 0.9 parts by mass based on 100 parts by mass of the base polymer of a thiuram-based vulcanization accelerator.

2. The semiconductive roller according to claim 1, wherein the thiourea-based crosslinking component contains a thiourea-based crosslinking agent and a crosslinking accelerator accelerating crosslinking caused by the thiourea-based crosslinking agent.

3. The semiconductive roller according to claim 1, wherein the sulfur-based vulcanizing component contains at least one material selected from a group consisting of sulfur and a sulfur-containing vulcanizing agent and a sulfur-containing accelerator.

4. The semiconductive roller according to claim 1, wherein the semiconductive rubber component further contains a hydrophobic ion-conductive agent.

5. The semiconductive roller according to claim 4, wherein the hydrophobic ion-conductive agent is at least one material selected from a group consisting of tetrabutylammonium perchlorate and N-butyl-3-methylpyridinium•bistrifluoromethane sulfonyl imide.

6. The semiconductive roller according to claim 1, wherein the semiconductive rubber composition further contains at least one additive selected from a group consisting of a supplement vulcanization accelerator, an acid acceptor, a processing aid, a filler, an age resistor, an antioxidant, an antiscorching agent, an ultraviolet absorber, a lubricant, a pigment, a flame retardant, a neutralizer and an antifoaming agent.

7. A charging roller, employed for an image forming apparatus utilizing electrophotography, comprising: a roller body having an outer peripheral surface made of a semiconductive rubber composition; and an oxide film formed by ultraviolet irradiation covering the outer peripheral surface of the roller body, wherein the semiconductive rubber composition contains a base polymer a crosslinking component for crosslinking the base polymer, 3 to 7 parts by mass based on 100 parts by mass of the base polymer of a metallic oxide or aliphatic acid vulcanization accelerator, and 1 to 5 parts by mass based on 100 parts by mass of the base polymer of an acid acceptor, the base polymer is a mixture of a bicopolymer E containing epichlorohydrin and nitrile-butadiene rubber N, while the mass ratio EN of the bicopolymer E and the nitrile-butadiene rubber N in the mixture is 50/50 to 80/20, and the crosslinking component includes (i) 0.3 to 1 part by mass with respect to 100 parts by mass of the base polymer of a thiourea-based crosslinking agent and 0.3 to 1 part by mass based on 100 parts by mass of the base polymer of a guanidine-based crosslinking accelerator for crosslinking the bicopolymer E, and (ii) a sulfur-based vulcanizing component for vulcanizing the nitrile-butadiene rubber N, which sulfur-based vulcanizing component provides 1 to 2 parts by mass based on 100 parts by mass of the base polymer of sulfur and which sulfur-based vulcanizing component comprises 1 to 2 parts by mass based on 100 parts by mass of the base polymer of a thiazole-based vulcanization accelerator and 0.3 to 0.9 parts by mass based on 100 parts by mass of the base polymer of a thiuram-based vulcanization accelerator.

8. An electrophotographic apparatus comprising a charging roller, wherein the charging roller includes: a roller body having an outer peripheral surface made of a semiconductive rubber composition; and an oxide film formed by ultraviolet irradiation covering the outer peripheral surface of the roller body, the semiconductive rubber composition contains a base polymer, a crosslinking component for crosslinking the base polymer, 3 to 7 parts by mass based on 100 parts by mass of the base polymer of a metallic oxide or aliphatic acid vulcanization accelerator, and 1 to 5 parts by mass based on 100 parts by mass of the base polymer of an acid acceptor, the base polymer is a mixture of a bicopolymer E containing epichlorohydrin and nitrile-butadiene rubber N, while the mass ratio E/N of the bicopolymer E and the nitrile-butadiene rubber N in the mixture is 50/50 to 80/20, and the crosslinking component includes (i) 0.3 to 1 part by mass with respect to 100 parts by mass of the base polymer of a thiourea-based crosslinking agent and 0.3 to 1 part by mass based on 100 parts by mass of the base polymer of a guanidine-based crosslinking accelerator for crosslinking the bicopolymer E, and (ii) a sulfur-based vulcanizing component for vulcanizing the nitrile-butadiene rubber N, which sulfur-based vulcanizing component provides 1 to 2 parts by mass based on 100 parts by mass of the base polymer of sulfur and which sulfur-based vulcanizing component comprises 1 to 2 parts by mass based on 100 parts by mass of the base polymer of a thiazole-based vulcanization accelerator and 0.3 to 0.9 parts by mass based on 100 parts by mass of the base polymer of a thiuram-based vulcanization accelerator.

* * * * *